(12) United States Patent
Luo et al.

(10) Patent No.: US 12,463,332 B2
(45) Date of Patent: Nov. 4, 2025

(54) ELECTRONIC DEVICE AND CONTROL METHOD THEREFOR, AND NON-TRANSITORY STORAGE MEDIUM

(71) Applicant: GUANGDONG OPPO MOBILE TELECOMMUNICATIONS CORP., LTD., Dongguan (CN)

(72) Inventors: Yizhou Luo, Dongguan (CN); Jia Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 90 days.

(21) Appl. No.: 18/504,735

(22) Filed: Nov. 8, 2023

(65) Prior Publication Data
US 2024/0072427 A1  Feb. 29, 2024

Related U.S. Application Data

(63) Continuation of application No. PCT/CN2022/086683, filed on Apr. 13, 2022.

(30) Foreign Application Priority Data

May 14, 2021  (CN) .......................... 202110533843.8

(51) Int. Cl.
*H01Q 1/36* (2006.01)
*G01B 7/14* (2006.01)
(Continued)

(52) U.S. Cl.
CPC ................. *H01Q 1/36* (2013.01); *G01B 7/14* (2013.01); *G01R 29/0814* (2013.01); *H01Q 1/48* (2013.01); *H01Q 1/50* (2013.01)

(58) Field of Classification Search
CPC ............ H01Q 1/24; H01Q 1/245; H01Q 1/36; H01Q 1/48; H01Q 1/50; H01Q 5/40
See application file for complete search history.

(56) References Cited

U.S. PATENT DOCUMENTS

2016/0061983 A1  3/2016  Heikura et al.

FOREIGN PATENT DOCUMENTS

CN  102590867 A  7/2012
CN  106130589 A  11/2016
(Continued)

OTHER PUBLICATIONS

WIPO, International Search Report for PCT Application No. PCT/CN2022/086683, Jun. 21, 2022.
(Continued)

*Primary Examiner* — Hoang V Nguyen
(74) *Attorney, Agent, or Firm* — Sheppard, Mullin, Richter & Hampton LLP

(57) ABSTRACT

Provided are an electronic device, a control method thereof, and a non-transitory computer-readable storage medium. The electronic device includes: a first antenna radiator, a sensing body, a specific absorption rate (SAR) sensor and a controller. A path capable of transporting a direct current is provided between the first antenna radiator and at least one of a grounding terminal and a feeding terminal. The sensing body is configured to generate a capacitance signal by sensing a distance between a user and the sensing body. The SAR sensor is connected with the sensing body, and the SAR sensor is configured to receive the capacitance signal. The controller is connected with the SAR sensor, and the controller is configured to control, according to the capacitance signal, a transmit power of the first antenna radiator.

20 Claims, 5 Drawing Sheets

(51) Int. Cl.
*G01R 29/08* (2006.01)
*H01Q 1/48* (2006.01)
*H01Q 1/50* (2006.01)

(56) References Cited

FOREIGN PATENT DOCUMENTS

| | | | | |
|---|---|---|---|---|
| CN | 107548145 A | 1/2018 | | |
| CN | 109068383 A | 12/2018 | | |
| CN | 110199480 A | * 9/2019 | ............ | H01Q 1/243 |
| CN | 110244134 A | 9/2019 | | |
| CN | 110289495 A | 9/2019 | | |
| CN | 111405652 A | 7/2020 | | |
| CN | 111491051 A | * 8/2020 | ........... | H04B 1/3838 |
| CN | 111511006 A | 8/2020 | | |
| CN | 111541803 A | 8/2020 | | |
| CN | 112114202 A | 12/2020 | | |
| CN | 212115692 U | * 12/2020 | ............ | G01R 29/08 |
| FR | 2865071 A1 | 7/2005 | | |
| JP | 2006174137 A | 6/2006 | | |

OTHER PUBLICATIONS

CNIPA, First Office Action for CN Application No. 202110533843.8, Feb. 22, 2025.
CNIPA, Second Office Action for CN Application No. 202110533843.8 mailed on Jun. 13, 2025.
CNIPA, Third Office Action for CN Application No. 202110533843.8 mailed on Aug. 27, 2025.

* cited by examiner

ELECTRONIC DEVICE AND CONTROL METHOD THEREFOR, AND NON-TRANSITORY STORAGE MEDIUM

CROSS-REFERENCING OF RELEVANT APPLICATIONS

This application is a continuation of International Patent Application No. PCT/CN2022/086683, filed Apr. 13, 2022, which claims priority to Chinese patent application No. 202110533843.8, filed May 14, 2021, both of which are herein incorporated by reference in their entireties.

TECHNICAL FIELD

The present disclosure relates to the technical field of electronic devices, and in particular to an electronic device, a control method thereof, and a non-transitory storage medium.

BACKGROUND

With the development and progress of technologies, 5G mobile terminals are gradually applied widespread. There are many antennas in the 5G mobile terminal, and there are strict compliance requirements on specific absorption rate (SAR). In order to avoid the SAR from exceeding the standard, it is necessary to control and adjust the SAR of an electronic device. Therefore, there is a need for an electronic device capable of controlling and adjusting the SAR.

It is notable that the information disclosed in the background section is only used to enhance the understanding of the background of the present disclosure, and it may include information that does not constitute the prior art known to those of ordinary skill in the art.

SUMMARY

The present disclosure aims at providing an electronic device, a control method thereof, and a non-transitory storage medium.

In a first aspect of the present disclosure, an electronic device is provided, and the electronic device includes: a first antenna radiator, where a path capable of transporting a direct current is provided between the first antenna radiator and at least one of a grounding terminal and a feeding terminal; a sensing body, where the sensing body is configured to generate a capacitance signal by sensing a distance between a user and the sensing body, and a distance between the first antenna radiator and the sensing body is less than a first preset distance threshold; a SAR sensor, where the SAR sensor is connected with the sensing body, and the SAR sensor is configured to receive the capacitance signal generated through the sensing of the sensing body; and a controller, where the controller is connected with the SAR sensor, and the controller is configured to control, according to the capacitance signal, a transmit power of the first antenna radiator.

In a second aspect of the present disclosure, a control method for an electronic device is provided, and the method includes: acquiring a capacitance signal generated through sensing of a sensing body; and in response to the capacitance signal generated through the sensing of the sensing body increasing, controlling a first antenna radiator to reduce a transmit power, where a path capable of transporting a direct current is provided between the first antenna radiator and at least one of a grounding terminal and a feeding terminal.

In a third aspect of the present disclosure, a non-transitory computer-readable storage medium is provided. The non-transitory computer-readable storage medium stores a computer program therein, and the computer program, when being executed by a processor to: acquire a capacitance signal generated through sensing of a sensing body; and in response to the capacitance signal generated through the sensing of the sensing body increasing, control a first antenna radiator to reduce a transmit power, where a path capable of transporting a direct current is provided between the first antenna radiator and at least one of a grounding terminal and a feeding terminal, and a distance between the first antenna radiator and the sensing body is less than a first preset distance threshold.

It is understandable that the above general description and the following detailed description are only exemplary and explanatory, which may not restrict the present disclosure.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

The drawings herein, which are incorporated in and constitute a part of the specification, illustrate embodiments consistent with the present disclosure, and explain, together with the description, the principles of the present disclosure. It is evident that the drawings in the following description are only some embodiments of the present disclosure. For those skilled in the art, other drawings may be obtained based on these drawings without any creative effort.

DETAILED DESCRIPTION OF EMBODIMENTS

Figure 1:
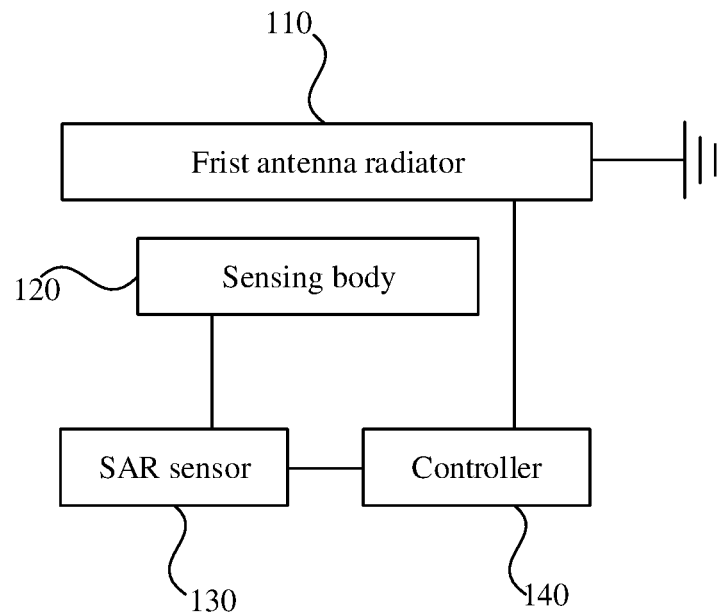
FIG. 1 is a schematic block diagram of a first electronic device provided in exemplary embodiments of the present disclosure.

Exemplary implementations are now described more comprehensively with reference to the accompanying drawings. However, exemplary implementations may be implemented in various forms and shall not be construed as being limited to the implementations set forth herein. Rather, the implementations are provided for the purpose of making the disclosure comprehensive and complete, and fully conveying concepts of the exemplary implementations to those skilled in the art. Same reference numerals in the drawings indicate same or similar structures, and their detailed descriptions are omitted.

Although relative terms, such as "up" and "down", are used in the specification to describe a relative relationship of one illustrated component to another illustrated component, these terms are used in the specification only for convenience, such as exemplifying the directions according to the drawings. It is understandable that, if the illustrated device is turned upside down, the components described as being "up" become the components described as being "down". When a certain structure is "on" other structures, it may mean that the structure is integrally formed on other structures, or that the structure is "directly" provided on other structures, or that the structure is "indirectly" provided on other structures through another structure.

Specific absorption rate (SAR) is defined as: an electromagnetic power absorbed or consumed by human tissue per unit mass, under the action of an external electromagnetic field, and the unit of the SAR is W/kg. For the protection of human health, it is necessary to detect the status of an electronic device and a user. The human body is a conductor, and when the human body approaches a conductor in the electronic device, a capacitance value sensed by the conductor in the electronic device is changed. An approaching degree of the human body may be detected by detecting the change of the capacitance value of the conductor in the electronic device.

When the human body approaches the electronic device, a part of the human body and the conductor in the electronic conductor may define a capacitor, where the part of the human body and a part of the conductor, which face toward each other, are each a capacitor plate. The capacitance value between the two capacitor plates is defined as the following formula:

$$C = \frac{Q}{U_A - U_B} = \frac{\varepsilon_r S}{4\pi k d}$$

where d is a distance between the two capacitor plates, S is an effective overlapping area between the two capacitor plates, and K is the electrostatic force constant. According to the capacitance formula, when d decreases, the capacitance value C increases; and when d increases, the capacitance value C decreases. Thus, the distance between the human body and the electronic device may be detected through the conductor in the electronic device.

An electronic device is provided in the exemplary embodiments of the present disclosure. As illustrated in FIG. 1, the electronic device includes a first antenna radiator 110, a sensing body 120, a SAR sensor 130, and a controller 140. There is a path capable of transporting a direct current between the first antenna radiator 110 and at least one of a grounding terminal and a feeding terminal. The sensing body 120 is configured to generate a capacitance signal by sensing the distance between the user and the sensing body 120. The SAR sensor 130 is connected with the sensing body 120, and the SAR sensor 130 is configured to receive the capacitance signal generated by the sensing body 120. The controller 140 is connected with the SAR sensor 130, and the controller 140 is configured to control, according to the capacitance signal, the transmit power of the first antenna radiator 110.

In the electronic device provided in the embodiments of the present disclosure, the sensing body 120 generates the capacitance signal by sensing the distance between the user and the sensing body 120. The SAR sensor 130 receives the capacitance signal generated through the sensing of the sensing body, and the controller 140 controls, according to the capacitance signal, the transmit power of the first antenna radiator. In this way, the electronic device can detect the SAR signal of the first antenna radiator 110 which has a direct current path to at least one of the grounding terminal and the feeding terminal, and can further adjust the transmit power of the first antenna radiator 110 to ensure that the SAR is in compliance with regulations.

Hereinafter, each part of the electronic device provided in the embodiments of the present disclosure will be described in detail.

In the embodiments of the present disclosure, the first antenna radiator 110 cannot be directly used to detect the SAR, and there is a direct current path between the first antenna radiator 110 and the at least one of the grounding terminal and the feeding terminal. It may be construed that the direct current may be transmitted between the first antenna radiator 110 and at least one of the grounding terminal and the feeding terminal. That is, the first antenna radiator 110 is connected with the grounding terminal, and no DC-blocking element (such as a capacitor) is provided between the first antenna radiator 110 and the grounding terminal. Alternatively, the first antenna radiator 110 is connected with the feeding terminal, and no DC-blocking device (such as a capacitor) is provided between the first antenna radiator 110 and the feeding terminal. Alternatively, the first antenna radiator 110 is connected with each of the feeding terminal and the grounding terminal, and no DC-blocking device (such as a capacitor) are provided between the first antenna radiator 110 and each of the feeding terminal and the grounding terminal. The feeding terminal refers to a terminal that provides a feeding signal to the first antenna radiator 110, and the feeding terminal is usually connected with a radio frequency circuit.

The first antenna radiator 110 may be provided at a side frame of the electronic device. For example, the first antenna radiator 110 may be one branch on a metal side frame. Alternatively, the first antenna radiator 110 may also be provided at a back cover and other parts of the electronic device, and the embodiments of the present disclosure is not limited thereto.

Since there is the direct current path between the first antenna radiator 110 and the at least one of the grounding terminal and the feeding terminal, when the human body is close to or away from the first antenna radiator 110, the SAR sensor 130 is unable to accurately detect the capacitance signal generated through sensing of the first antenna radiator 110. Therefore, the capacitance signal may be generated through detection of the sensing body 120, where the distance between the sensing body 120 and the first antenna radiator 110 is less than a preset threshold, such as a first preset distance threshold, so that when the human body is close to or away from the first antenna radiator 110, the capacitance signal generated through the sensing of the sensing body 120 may represent whether the human body is close to or away from the first antenna radiator 110.

The SAR sensor 130 may be a capacitance sensor, and the controller 140 may be a microcontroller unit (MCU), a single-chip microcomputer, or a processor (CPU). It is notable that the SAR sensor 130 and the controller 140 provided in the embodiments of the present disclosure may be integrated in a same module (for example, the SAR sensor 130 and the controller 140 may be integrated in a same chip), or the SAR sensor 130 and the controller 140 may be provided independently, which is not limited in the embodiments of the present disclosure.

A material of the sensing body 120 may be a conductive material or a semiconductive material such as ceramic ferrite, and the embodiments of the present disclosure are not limited thereto. That is, the material of the sensing body 120 may be any material that may sense the change in capacitance with the human body, and it is not limited to the conductive material.

In the embodiments of the present disclosure, the sensing body 120 may directly detect a SAR capacitance signal. The sensing body 120 is not grounded, or the sensing body 120 is grounded through the DC-blocking element (such as the capacitor). There is no direct current path between an SAR antenna radiator 200 and the feeding terminal, and there is no direct current path between the SAR antenna radiator 200 and the grounding terminal. This means that the SAR antenna radiator 200 is not grounded or the SAR antenna radiator 200 is grounded through the DC-blocking element (such as the capacitor), and the SAR antenna radiator 200 is not connected with the feeding terminal or the SAR antenna radiator 200 is connected with the feeding terminal through the DC-blocking element (such as the capacitor).

In a feasible implementation of the present disclosure, the sensing body 120 may be a parasitic branch coupled with the first antenna radiator 110, which parasitic branch is capable of directly detecting the SAR. The parasitic branch may be floating for the direct current, and the parasitic branch is connected with the SAR sensor 130. When the user approaches or moves away from the first antenna radiator 110, the capacitance signal generated through sensing by the parasitic branch is changed. The SAR sensor 130 detects the change of the capacitance value, and the controller 140 controls, according to the change of the capacitance signal, the transmit power of the first antenna radiator 110.

As an example, the parasitic branch may be a flexible circuit board branch, where the flexible circuit board branch is coupled with the first antenna radiator 110, and the flexible circuit board branch is floating. The flexible circuit board may extend from a mainboard of the electronic device to the first antenna radiator 110.

When the sensing body 120 and the first antenna radiator 110 are coupled, a first preset distance threshold may be 2 mm, 3 mm or 5 mm. In practical applications, the capacitance signal sensed by the sensing body 120 may be compensated according to the first preset distance threshold, so that the capacitance signal sensed by the sensing body 120 can accurately reflect a position relationship between the human body and the first antenna radiator 110.

In another feasible implementation of the present disclosure, the sensing body 120 and the first antenna radiator 110 are not coupled. The sensing body 120 and the first antenna radiator 110 being not coupled means that there is no effective current between the sensing body 120 and the first antenna radiator 110. The sensing body 120 may be other conductor elements in electronic device, where the conductor elements are provided within a preset distance threshold from the first antenna radiator 110, and terminal conductor elements are floating (not grounded, or grounded through the DC-blocking element). For example, the sensing body 120 may include one or more of a flexible circuit board, a volume key, a power-on key, a fingerprint module, a receiver, a speaker module, a camera module, a wireless charging module, a mainboard bracket, a subplate (secondary board) bracket, an NFC module, a camera decorative ring, a electroacoustic module and a conductor card tray.

When the sensing body 120 and the first antenna radiator 110 are not coupled, the first preset distance threshold may be 8 mm, 9 mm or 10 mm, etc. In practical applications, the capacitance signal sensed by the sensing body 120 may be compensated according to the first preset distance threshold, so that the capacitance signal sensed by the sensing body 120 can accurately reflect the position relationship between the human body and the first antenna radiator 110.

In a case where the sensing body 120 is the volume key, the volume key is made of a conductive material, such as aluminum alloy, stainless steel or copper. The volume key may be provided at the side frame of the electronic device. An insulating coating may be provided at a part where the volume key is in contact with the side frame, so as to realize the floating of the volume key.

A through hole may be provided in the side frame of the electronic device, and the volume key enters the internal of the electronic device through the through hole, and is connected to a volume adjusting circuit. In order to isolate the volume key from the side frame, an insulating material may be coated on the surface of the volume key. Of course, in practical applications, the insulating material may also be coated on an inner wall of the through hole in the side frame.

In a case where the sensing body 120 is a power-on key, the power-on key is made of a conductive material, such as the aluminum alloy, stainless steel and other materials. The power-on key may be provided at the side frame of the electronic device. The insulating coating may be provided at a part where the power key is in contact with the side frame, so as to realize the floating of the power key.

The through hole may be provided in the side frame of the electronic device, and the power-on key enters the internal of the electronic device through the through hole, and is connected to a power-on circuit. In order to isolate the power-on key from the side frame, the insulating material may be coated on the surface of the power-on key. Of course, in practical applications, the insulating material may also be coated on the inner wall of the through hole in the side frame.

In a case where the sensing body 120 is a mainboard bracket, the mainboard bracket may be made of a conductive material, such as aluminum alloy, copper or stainless steel. The mainboard bracket may be provided at a middle frame, and the mainboard is installed at the mainboard bracket. Because the middle frame and the mainboard are grounded, it is necessary to insulate the mainboard bracket from the mainboard and the middle frame. For example, the mainboard bracket includes a first contact part and a second contact part, the first contact part is in contact with the middle frame, and the second contact part is connected with the mainboard. The insulating material may be coated on the first contact part and the second contact part of the mainboard bracket to form an insulating layer.

In a case where the sensing body 120 is the subplate bracket, the subplate bracket may be made of a conductive material, such as aluminum alloy, copper or stainless steel. The subplate bracket may be provided at the middle frame, and the subplate is installed at the subplate bracket. Because the middle frame and the subplate are grounded, it is necessary to insulate the subplate bracket from the subplate and the middle frame. For example, the subplate bracket includes a first contact part and a second contact part, the first contact part is in contact with the middle frame, and the second contact part is connected with the subplate. The first contact part and the second contact part of the subplate bracket may be coated with the insulating material to form the insulating layer.

In a case where the sensing body 120 is a card tray, the card tray may include a conductive part, and the conductive part may be made of the aluminum alloy, copper or stainless steel, etc. The card tray may include the conductive part, a connecting part, and an accommodating part. Two ends of the connecting part are connected with the conductive part and the accommodating part respectively, and the accommodating part is configured for placement of a readable electronic card. When installed in the electronic device, the conductive part is exposed to the side frame of the electronic device. A through hole may be provided in the side frame of the electronic device, and the conductive part extends into the through hole. An insulating layer may be provided on the sidewall of the conductive part, where the sidewall of the conductive part refers to a part facing toward the through hole. The connecting part may be made of an insulating material. Since a ground point is provided on the accommodating part, the conductive part is isolated/insulated from the accommodating part through the connecting part. The SAR sensor 130 may be connected with the conductive part, and the conductive part of the card tray serves as the sensing body 120.

Figure 2:
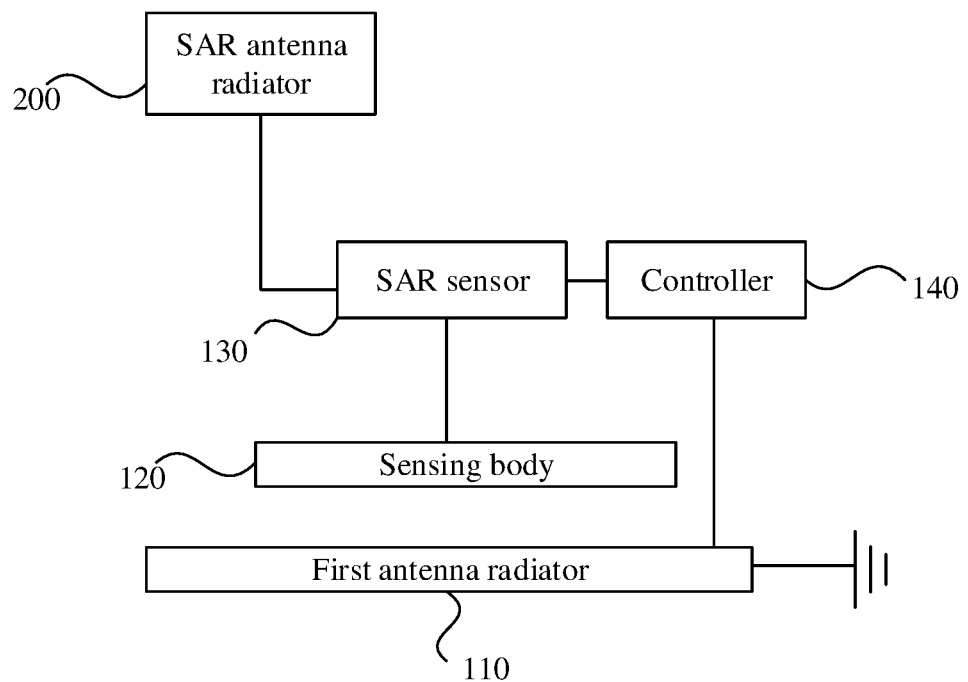
FIG. 2 is a schematic block diagram of a second electronic device provided in exemplary embodiments of the present disclosure.

Further, as illustrated in FIG. 2, the electronic device provided in the embodiments of the present disclosure may further include one or more SAR antenna radiators 200, and each SAR antenna radiator may be directly used to detect the SAR. There is no direct current path between the SAR antenna radiator 200 and the feeding terminal, and there is no direct current path between the SAR antenna radiator 200 and the grounding terminal. That is, the SAR antenna radiator 200 and the feeding terminal are not connected (coupled), or a DC-blocking element (capacitor) is provided between the SAR antenna radiator 200 and the feeding terminal. In addition, the SAR antenna radiator 200 is not connected (coupled) with the grounding terminal, or a DC-blocking element (capacitor) is provided between the SAR antenna radiator 200 and the grounding terminal.

The SAR antenna radiator 200 is connected with the SAR sensor 130, and the SAR sensor 130 receives a capacitance signal sensed by the SAR antenna radiator 200.

The SAR antenna radiator 200 may be provided at a second area of the side frame of the electronic device, and the first antenna radiator 110 may further be provided at a first area of the side frame of the electronic device, where the first area of the side frame and the second area of the side frame do not overlap.

When the electronic device includes multiple SAR antenna radiators 200, the multiple SAR antenna radiators 200 are provided at different positions in the second area of the side frame of the electronic device. Through the first antenna radiator 110 and the multiple SAR antenna radiators 200, it is possible to detect, at different positions of the electronic device, whether the human body is close to or away from there, so that the capacitive signals may be detected in different areas, which enables a fine control of the power of antennas (the power of an antenna radiator where the human body is close to is reduced, and an antenna radiator where no human body is close to operates at full power), so that the electronic device can balance compliance of the SAR and communication performance.

It is notable that the first antenna radiator 110 and the SAR antenna radiators 200 provided in the embodiments of the present disclosure may also be provided at the back cover and other positions of electronic device, and this is not limited in the disclosed embodiments.

Figure 3:
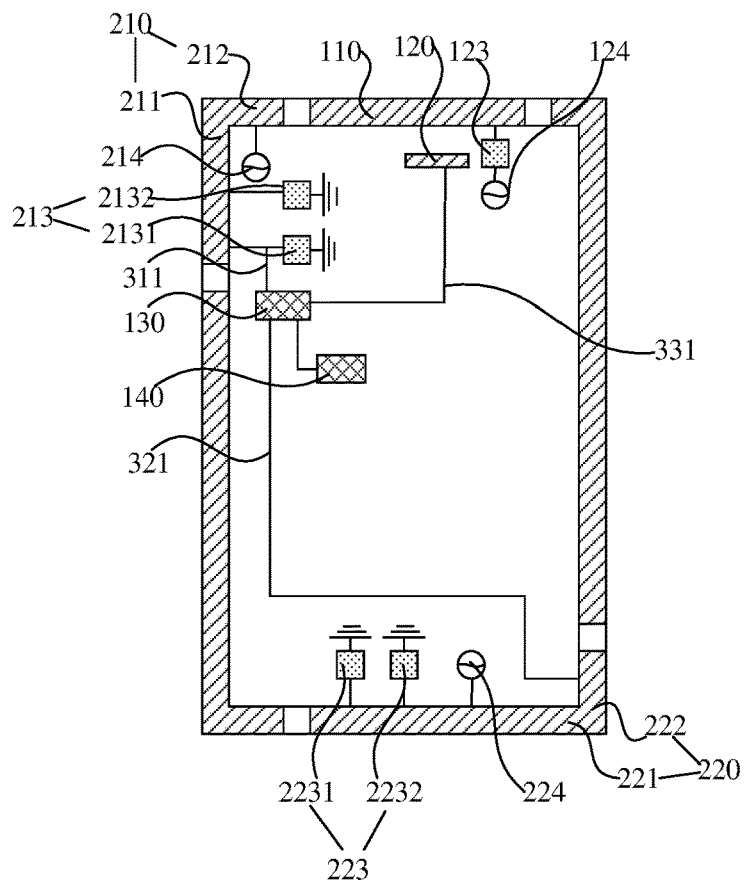
FIG. 3 is a schematic structural diagram of a first electronic device provided in exemplary embodiments of the present disclosure.

For example, as illustrated in FIG. 3, the multiple SAR antenna radiators 200 include a first SAR antenna radiator 210 and a second SAR antenna radiator 220. There is no direct current path between the first SAR antenna radiator 210 and each of the grounding terminal and the feeding terminal, and the first SAR antenna radiator 210 is connected with the SAR sensor 130. The first SAR antenna radiator 210 is provided in the second area of the side frame. There is no direct current path between the second SAR antenna radiator 220 and each of the grounding terminal and the feeding terminal, and the second SAR antenna radiator 220 is connected with the SAR sensor 130. The second SAR antenna radiator 220 is provided in the second area of the side frame. The first antenna radiators 110 and the second SAR antenna radiator 220 are insulated from each other. There is a gap between the first antenna radiator 110 and the first SAR antenna radiator 210, and the gap may be filled with an insulating material.

In this case, the SAR sensor 130 may receive capacitance signals from the sensing body 120, the first SAR antenna radiator 210 and the second SAR antenna radiator 220. The controller 140 controls, according to the capacitance signals, the transmit power of the corresponding antenna radiators.

In the electronic device provided in the embodiments of the present disclosure, a first capacitance signal is generated through sensing of the floating sensing body 120, a second capacitance signal is generated through sensing of the floating first SAR antenna radiator 210, and a third capacitance signal is generated through sensing of the floating second SAR antenna radiator 220. The first capacitance signal, the second capacitance signal and the third capacitance signal are received by the SAR sensor 130. The controller 140 determines, according to the first capacitance signal, the second capacitance signal and the third capacitance signal, a state relationship between the electronic device and the user (that is, a state that the user holds the electronic device), so that the transmit power of the antennas may be adjusted according to the current usage scene. On the one hand, the SAR can be prevented from exceeding the standard, and on the other hand, an operation of directly reducing the transmit power of all the antennas can be avoided, which improves the communication performance of the electronic device.

The side frame of the electronic device may be a metal side frame, and the metal side frame is divided into multiple conductor branches. The first antenna radiator 110 is one of the branches of the metal side frame, and the first antenna radiator 110 is a mid-high frequency antenna. The first antenna radiator 110 may be an MHB DRX, 5G41/N78/N79 antenna radiator. The first SAR antenna radiator 210 is one of the multiple branches of the metal side frame, and the first SAR antenna radiator 210 may realize cellular, GPS L1, and WIFI communication functions. The second SAR antenna radiator 220 is one of the multiple branches of the metal side frame, and the second SAR antenna radiator 220 may be a low-frequency antenna. For example, the second SAR antenna radiator 220 may be configured for communication at one or more of B5, B8, B20, and B28.

As illustrated in FIG. 3, the first SAR antenna radiator 210 includes a first conductor part 211 and a second conductor part 212. The first conductor part 211 extends in a first direction. The second conductor part 212 is connected with the first conductor part 211, and the second conductor part 212 extends in a second direction. The first direction and the second direction are perpendicular to each other, and the second conductor part 212 is provided at the top of the side frame.

The first SAR antenna radiator 210 is connected with each of a first tuning circuit 213 and a first feeding circuit 214. The first feeding circuit 214 is configured to feed a first excitation signal, and the first excitation signal is configured to excite the first SAR antenna radiator 210 to receive and transmit a first radio frequency signal.

The first tuning circuit 213 may include a first tuning sub-circuit 2131 and a second tuning sub-circuit 2132. A first terminal of the first tuning sub-circuit 2131 is connected with the first conductor part 211, and a second terminal of the first tuning sub-circuit 2131 is grounded. A first terminal of the second tuning sub-circuit 2132 is connected with the first conductor part 211, and a second terminal of the second tuning sub-circuit 2132 is grounded. A first terminal of the first feeding circuit 214 is connected with the second conductor part 212, and a second terminal of the first feeding circuit 214 may be connected with a radio frequency module.

The first tuning sub-circuit 2131 may include a first tuning switch, a first terminal of the first tuning switch is connected with the first conductor part 211, and a second terminal of the first tuning switch is grounded. For example, the first tuning switch may include a first MOS transistor, a first terminal of the first MOS transistor is connected with the first conductor part 211, and a second terminal of the first MOS transistor is grounded. The first MOS transistor may be in an off state during SAR detection. The second tuning sub-circuit 2132 may include a second tuning switch, a first terminal of the second tuning switch is connected with the first conductor part 211, and a second terminal of the second tuning switch is grounded. For example, the second tuning switch may include a second MOS transistor, a first terminal of the second MOS transistor is connected with the first conductor part 211, and a second terminal of the second MOS transistor is grounded. The second MOS transistor may be in the off state during the SAR detection.

The first feeding circuit 214 may include a first feeding branch, and the first feeding branch is connected with each of the second conductor part 212 and the ratio frequency module. One terminal of the first feeding branch may be directly connected with the second conductor part 212, or the first feeding branch is in inductive coupling with the second conductor part 212. The other terminal of the first feeding branch may be connected with the ratio frequency module.

The second SAR antenna radiator 220 is connected with the SAR sensor 130, and the second SAR antenna radiator 220 is provided at the side frame of the electronic device. The second SAR antenna radiator 220 is one of the multiple branches of the metal side frame. The second SAR antenna radiator 220 may be the low-frequency antenna. For example, the second SAR antenna radiator 220 may be configured or communication at one or more of B5, B8, B20, and B28.

The second SAR antenna radiator 220 includes a third conductor part 221 and a fourth conductor part 222. The third conductor part 221 is provided at the bottom of the side frame and located on a side of the first conductor part 211 away from the second conductor part 212. The third conductor part 221 extends along the second direction. The fourth conductor part 222 is located on a side of the third conductor part 221 away from the first conductor part 211, and the fourth conductor part 221 is connected with the third conductor part 221. The fourth conductor part 222 extends along the first direction.

The second SAR antenna radiator 220 is connected with a second tuning circuit 223 and a second feeding circuit 224. The second feeding circuit 224 is configured to feed a second excitation signal, and the second excitation signal is configured to excite the second SAR antenna radiator 220 to receive and transmit a second radio frequency signal. The second SAR antenna radiator 220 may be connected with the second tuning circuit through a second connection line, and the SAR sensor 130 may be connected with the second connection line.

The second tuning circuit 223 includes a third tuning sub-circuit 2231 and a fourth tuning sub-circuit 2232. A first terminal of the third tuning sub-circuit 2231 is connected with the third conductor part 221, and a second terminal of the third tuning sub-circuit 2231 may be grounded. A first terminal of the fourth tuning sub-circuit 2232 is connected with the third conductor part 221, and a second terminal of the fourth tuning sub-circuit 2232 may be grounded. A first terminal of the second feeding circuit 224 is connected with the third conductor part 221, and a second terminal of the second feeding circuit 224 may be connected with the radio frequency module.

The third tuning sub-circuit 2231 may include a third tuning switch. A first terminal of the third tuning switch is connected with the third conductor part 221, and a second terminal of the third tuning switch may be grounded. For example, the third tuning switch may include a third MOS transistor, a first terminal of the third MOS transistor is connected with the third conductor part 221, and a second terminal of the third MOS transistor may be grounded. The third MOS transistor may be in an off state during the SAR detection. The fourth tuning sub-circuit 2232 may include a fourth tuning switch. A first terminal of the fourth tuning switch is connected with the third conductor part 221, and a second terminal of the fourth tuning switch may be grounded. For example, the fourth tuning switch may include a fourth MOS transistor, a first terminal of the fourth MOS transistor is connected with the third conductor part 221, and a second terminal of the fourth MOS transistor may be grounded. The fourth MOS transistor may be in the off state during the SAR detection.

The second feeding circuit 224 may include a second feeding branch, and the second feeding branch is connected with each of the third conductor part 221 and the ratio frequency module. One terminal of the second feeding branch may be directly connected with the third conductor part 221, or the second feeding branch may be in inductive coupling with the third conductor part 221. The other terminal of the second feeding branch may be connected with the ratio frequency module.

The first antenna radiator 110 is provided at the top of the side frame of the electronic device, and the first antenna radiator 110 is provided at a side of the second conductor part 212 away from the first conductor part 211. There is a gap between the first antenna radiator 110 and the first SAR antenna radiator 210, and the gap may be filled with the insulating material. The first antenna radiator 110 may also be connected with a tuning circuit 123 and a feeding circuit 124. The feeding circuit 124 is connected with the ratio frequency module, and the tuning circuit 123 is grounded. The first antenna radiator 110 has a grounding part, and the grounding part is directly grounded, so that the first antenna radiator 110 is not floating.

In the embodiments of the present disclosure, the way that the user holds the electronic device may be determined by means of the changes of the capacitances sensed by the sensing body 120, the first SAR antenna radiator 210 and the second SAR antenna radiator 220, and the transmit power of the corresponding antennas may be determined according to the way that the user holds the electronic device.

For example, when the capacitance sensed by the sensing body 120 gradually increases, it shows that the user is approaching the first antenna radiator 110; and when the capacitance sensed by the sensing body 120 gradually decreases, it shows that the user is moving away from the first antenna radiator 110. When the capacitance sensed by the first SAR antenna radiator 210 gradually increases, it shows that the user is approaching the first SAR antenna radiator 210; and when the capacitance sensed by the first SAR antenna radiator 210 gradually decreases, it shows that the user is moving away from the first SAR antenna radiator 210. When the capacitance sensed by the second SAR antenna radiator 220 gradually increases, it shows that the user is approaching the second SAR antenna radiator 220; and when the capacitance sensed by the second SAR antenna radiator 220 gradually decreases, it shows that the user is moving away from the second SAR antenna radiator 220.

Corresponding relationships between the scenes how the user holds the electronic device and detected states of the sensing body 120, the first SAR antenna radiator 210 and the second SAR antenna radiator 220 may be illustrated in Table 1. In Table 1, sensor pad (sensing capacitor plate) 1 represents the first SAR antenna radiator 210, sensor pad 3 represents the second SAR antenna radiator 220, and sensor pad 2 represents the sensing body 120. Since the distance between the first antenna radiator 110 and the sensing body 120 is less than the first preset distance threshold, the human body being close to or away from the sensing body 120 means that the human body being close to or away from the first antenna radiator 110.

TABLE 1

| Scenes of a user | Scenes identified for the sensor pads |
|---|---|
| Hold the lower antenna with one hand | Sensor pads 1 and 2 are identified as being away from the human body, and Sensor pad 3 is identified as being close to the human body. |
| Hold the upper antenna with one hand | Sensor pads 1 and 2 are identified as being close to the human body, and sensor pad 3 is identified as being away from the human body. |
| Other holding ways | Sensor pads 1 and 3 are identified as being close to the human body, and sensor pad 2 is identified as being away from the human body. |
| | Sensor pads 2 and 3 are identified as being close to the human body, and sensor pad 1 is identified as being away from the human body. |
| | Sensor pads 1, 2 and 3 are identified as being close to the human body. |
| All away | Sensor pads 1, 2 and 3 are identified as being away from the human body. |

As illustrated in Table 1, the second SAR antenna radiator 220 is located at the bottom of the electronic device, and the sensing body 120 and the first SAR antenna radiator are located at the top of the electronic device. Sensor pad 3 is configured to identify a scene that the bottom of the electronic device is held by one hand of the user; and in this identified scene, sensor pad 1 and sensor pad 2 are both in the scene of being away from the human body; thus, the second SAR antenna radiator 220 performs a board-level back-off (which reduces the transmit power of the antenna), and the first SAR antenna radiator 210 and the first antenna radiator 110 operate at full power. A usage scene that the upper antenna is held by one hand is identified by means of both sensor pad 1 and sensor pad 2. In this case, sensor pad 3 is identifies as being away from the human body; thus, the first SAR antenna radiator 210 and the first antenna radiator 110 perform the board-level power back-off (which reduces the transmit power of the antennas), and the second SAR antenna radiator 220 operates at full power. In a case where the electronic device is held in a landscape mode, if only sensor pad 1 and sensor pad 3 are identified as being close to the human body and sensor pad 2 is identified as being away from the human body under the holding posture, the first SAR antenna radiator 210 and the second SAR antenna radiator 220 perform the board-level power back-off (which reduces the transmit power of the antennas), and the first antenna radiator 110 operates at full power. Similarly, if only sensor pad 2 and sensor pad 3 are identified as being close to the human body and sensor pad 1 is identified as being away from the human body under the holding posture, the second SAR antenna radiator 220 and the first antenna radiator 110 perform the board-level power back-off (which reduces the transmit power of the antennas), and the first SAR antenna radiator 210 operates at full power. However, if sensor pad 1, sensor pad 2 and sensor pad3 are all identified as being close to the human body, the first SAR antenna radiator 210, the second SAR antenna radiator 220 and the first antenna radiator 110 all need to perform the board-level power back-off (which reduces the transmit power of the antennas), so as to ensure that the SAR is in compliance with regulations.

Of course, in practical applications, the way that the user holds the electronic device may also be determined in other ways. For example, when the capacitance sensed by the first SAR antenna radiator 210 gradually increases, it shows that the human body is approaching the first SAR antenna radiator 210. When the capacitance sensed by the second SAR antenna radiator 220 gradually increases, it shows that the human body is approaching the second SAR antenna radiator 220. When the capacitance sensed by the sensing body 120 gradually increases, it shows that the human body is approaching the first antenna radiator 110.

In the embodiments of the present disclosure, the sensing body may be any one or more of the volume key, the power-on key, the fingerprint module, the receiver, the speaker module, the camera module, the wireless charging module, the mainboard bracket, the subplate bracket, the NFC module, the camera decorative ring, the electroacoustic module, and the conductor card tray. Therefore, as for the combination who detects the SAR capacitance values, it may be a combination of the first SAR antenna radiator 210, the second SAR antenna radiator 220 and the volume key; or a combination of the first SAR antenna radiator 210, the second SAR antenna radiator 220 and the power-on key; or a combination of the first SAR antenna radiator 210, the second SAR antenna radiator 220 and the fingerprint module; or a combination of the first SAR antenna radiator 210, the second SAR antenna radiator 220 and the receiver; or a combination of the first SAR antenna radiator 210, the second SAR antenna radiator 220 and the speaker module; or a combination of the first SAR antenna radiator 210, the second SAR antenna radiator 220 and a camera module; or a combination of the first SAR antenna radiator 210, the second SAR antenna radiator 220 and the wireless charging module; or a combination of the first SAR antenna radiator 210, the second SAR antenna radiator 220 and the mainboard bracket; or a combination of the first SAR antenna radiator 210, the second SAR antenna radiator 220 and the subplate bracket; or a combination of the first SAR antenna radiator 210, the second SAR antenna radiator 220 and the camera decorative ring; or a combination of the first SAR antenna radiator 210, the second SAR antenna radiator 220 and the conductor card tray.

Figure 4:
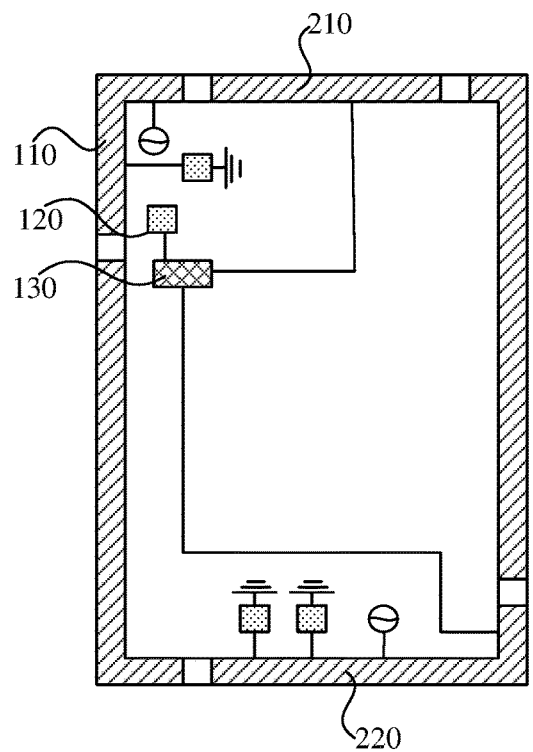
FIG. 4 is a schematic structural diagram of a second electronic device provided in exemplary embodiments of the present disclosure.

When the first antenna radiator 110 is located in an upper left corner of the side frame, the camera module, the NFC module, the power-on key and the volume key may commonly be provided in the upper left corner in the practical electronic device. Therefore, the sensing body 120 may also be one or more of the camera module, the camera decorative ring, the NFC module, the power-on key and the volume key. For example, the sensing body 120 in FIG. 4 may be the power-on key, the volume key or the card tray.

Figure 5:
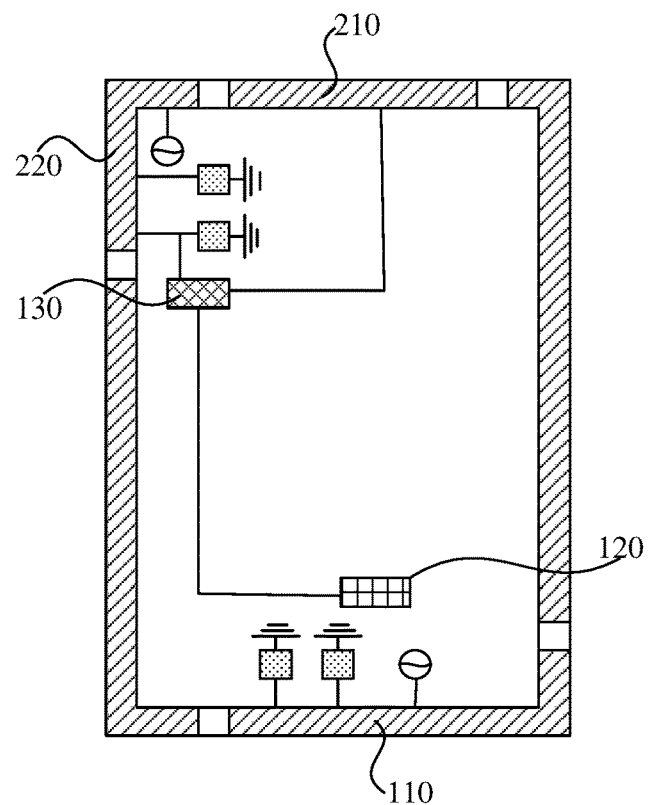
FIG. 5 is a schematic structural diagram of a third electronic device provided in exemplary embodiments of the present disclosure.

When the first antenna radiator 110 is located at the bottom of the side frame, the subplate bracket, the fingerprint module, the wireless charging module, the NFC module, the receiver and the speaker may be provided near the bottom of the side frame in the practical electronic device. Therefore, one or more of the subplate bracket, the fingerprint module, the wireless charging module, the NFC module, the receiver and the speaker may also serve as the sensing body 120. For example, the sensing body 120 in FIG. 5 may be the subplate bracket, the fingerprint module, the wireless charging module, the NFC module, the receiver, or the speaker.

When the first antenna radiator 110 is located at the top of the side frame, the camera module, the mainboard bracket, the fingerprint module, the NFC module, the wireless charging module and the speaker may be provided near the top of the side frame in the practical electronic device. Therefore, the sensing body 120 may be one or more of the camera module, the mainboard bracket, the fingerprint module, the NFC module, the wireless charging module and the speaker. For example, the sensing body 120 in FIG. 3 may be the camera module, the mainboard bracket, the fingerprint module, the NFC module, the wireless charging module, or the speaker.

The SAR sensor 130 is connected with each of the sensing body 120, the first SAR antenna radiator 210 and the second SAR antenna radiator 220, for receiving the first capacitance signal, the second capacitance signal and the third capacitance signal. The SAR sensor 130 may be a capacitance sensor. The capacitance sensor may determine whether the user is close to or far away, by detecting the changes of the capacitances sensed by the sensing body 120, the first SAR antenna radiator 210 and the second SAR antenna radiator 220 when the human body approaches or moves away from the electronic device.

The SAR sensor 130 includes at least three ports, and each antenna radiator or the sensing body 120 is connected with one port of the SAR sensor 130 through at least one channel. When the distance between the antenna radiator or the sensing body 120 and the SAR sensor 130 is greater than a second preset distance threshold, the antenna radiator or the sensing body 120 is in dual connection with the SAR sensor 130 through a detection channel and an auxiliary channel. When the distance between the antenna radiator or the sensing body 120 and the SAR sensor 130 is less than or equal to the second preset distance threshold, the antenna radiator or the sensing body 120 is connected with the SAR sensor 130 through the detection channel.

For example, when the distance between the sensing body 120 and the SAR sensor 130 is less than or equal to the second preset distance threshold, the sensing body 120 is connected with the SAR sensor 130 through the detection channel. When the distance between the sensing body 120 and the SAR sensor 130 is greater than the second preset distance threshold, the sensing body 120 is in differential connection with the SAR sensor 130 through the detection channel and the auxiliary channel.

When the distance between the SAR antenna radiator 200 and the SAR sensor 130 is greater than the second preset distance threshold, the detection channel generates a first noise signal by sensing an environmental noise, and the auxiliary channel generates a second noise signal by sensing the environmental noise. The second noise signal is used to simulate the first noise signal, so that a signal transmitted to the SAR sensor 130 through the detection channel is compensated by using the second noise signal.

The auxiliary channel is configured to make the second noise signal be consistent with the first noise signal. The consistency of the second noise signal and the first noise signal means that the second noise signal is the same as or approximates (having an error within the tolerance limits) the first noise signal. For example, a capacitance-temperature curve of the auxiliary channel is consistent with a capacitance-temperature curve of the detection channel, or a wiring path of the auxiliary channel is consistent with a wiring path of the detection channel.

When the distance between the first SAR antenna radiator 210 and the SAR sensor 130 is less than or equal to the second preset distance threshold, the first SAR antenna radiator 210 is connected with the SAR sensor 130 through the detection channel. When the distance between the first SAR antenna radiator 210 and the SAR sensor 130 is greater than the second preset distance threshold, the first SAR antenna radiator 210 is in differential connection with the SAR sensor 130 through the detection channel and the auxiliary channel. When the distance between the second SAR antenna radiator 220 and the SAR sensor 130 is less than or equal to the second preset distance threshold, the second SAR antenna radiator 220 is connected with the SAR sensor 130 through the detection channel. When the distance between the second SAR antenna radiator 220 and the SAR sensor 130 is greater than the second preset distance threshold, the second SAR antenna radiator 220 is in differential connection with the SAR sensor 130 through the detection channel and the auxiliary channel.

Figure 6:
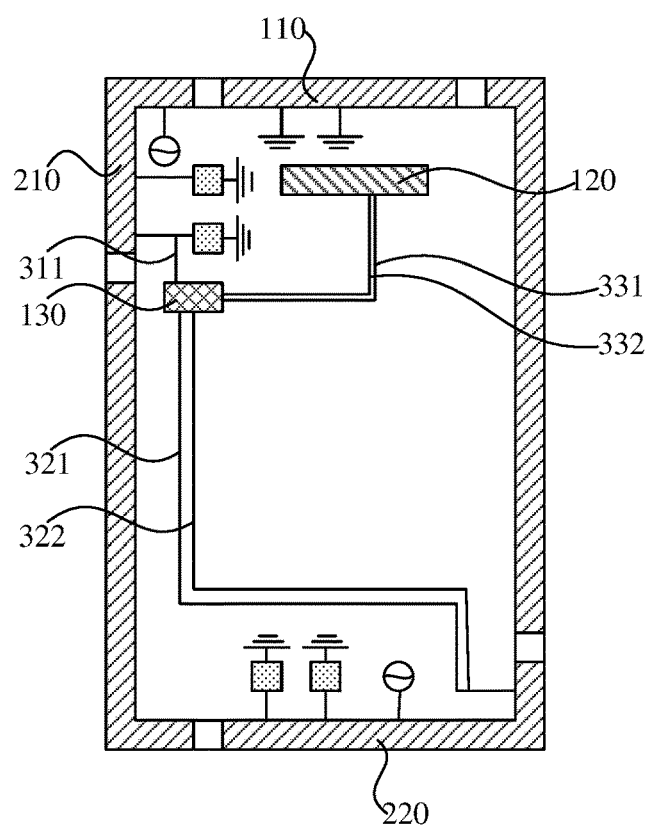
FIG. 6 is a schematic structural diagram of a fourth electronic device provided in exemplary embodiments of the present disclosure.

For example, as illustrated in FIG. 6, the first SAR antenna radiator 210 is connected with the SAR sensor 130 through a first detection channel 311, the second SAR antenna radiator 220 is connected with the SAR sensor 130 through a second detection channel 321 and a first auxiliary channel 322, and the sensing body 120 is connected with the SAR sensor 130 are connected through a third detection channel 331 and a second auxiliary channel 332. The distance between the first SAR antenna radiator 210 and the SAR sensor 130 is less than or equal to the second preset distance threshold, and the distance between the SAR sensor 130 and each of the sensing body 120 and the second SAR antenna radiator 220 is greater than the second preset distance threshold.

The second preset distance threshold may be 5 mm, 10 mm, 20 mm, etc. When the distance between the sensing body 120 or the antenna radiator and the SAR sensor 130 is less than or equal to the second preset distance threshold, the path of the detection channel connecting the sensing body 120 or the antenna radiator and the SAR sensor 130 is short, and there is little interference on the path. When the distance between the sensing body 120 or the antenna radiator and the SAR sensor 130 is greater than the second preset distance threshold, the path of the detection channel connecting the sensing body 120 or the antenna radiator and the SAR sensor 130 is long, and there are many interferences on the path. In order to improve the detection accuracy, the auxiliary channel and the detection channel are jointly adopted for detection. The first auxiliary channel 322 may be a first temperature compensation channel and the second auxiliary channel 332 may be a second temperature compensation channel.

In order to improve the detection accuracy, the wiring path of the second detection channel 321 is consistent with the wiring path of the first auxiliary channel 322, and the wiring path of the third detection channel 331 is consistent with the wiring path of the second auxiliary channel 332. By making the path of the second detection channel 321 be consistent with the path of the first auxiliary channel 322, a wiring environment of the first auxiliary channel 322 is consistent with the wiring environment of the second detection channel 321, thus avoiding the influence of the environment on the detection result. By making the path of the third detection channel 331 is consistent with the path of the second auxiliary channel 332, the wiring environment of the second auxiliary channel 332 may be consistent with the wiring environment of the third detection channel 331, thus avoiding the influence of the environment on the detection result.

The second SAR antenna radiator 220 is in differential connection with the SAR sensor 130 through the second detection channel 321 and the first auxiliary channel 322, and the sensing body 120 is in differential connection with the SAR sensor 130 through the third detection channel 331 and the second auxiliary channel 332. By means of the differential connection, a common-mode signal can be suppressed; in addition, the differential connection mode is insensitive to temperature, which can avoid the influence of environmental temperature on the detection results.

The SAR sensor 130 may include five ports, and the five ports may be respectively connected with the first detection channel 311, the second detection channel 321, the third detection channel 331, the first auxiliary channel 322, and the second auxiliary channel 332. The SAR sensor 130 may be provided on the mainboard and located in the upper left corner of the electronic device, so that the distance between the SAR sensor 130 and the first SAR antenna radiator 210 is less than the second preset threshold.

Of course, in practical applications, the SAR sensor 130 is connected with at least one sensing body 120 or antenna radiator. Multiple SAR sensors 130 may be distributed in different positions of the electronic device, for example, the multiple SAR sensors 130 may be respectively arranged at the vertexes of the electronic device. Alternatively, one SAR sensor 130 may be arranged on the mainboard of the electronic device, and one SAR sensor 130 may be arranged on the subplate of the electronic device.

For example, the SAR sensor 130 is connected with 5 channels, and the channels of the SAR sensor 130 may be specifically allocated according to the number of conductor branches (the antenna radiators or sensing bodies 120) of the electronic device. For example, one SAR sensor 130 currently having 5 channels may be applied to one conductor branch (1 detection channel and 0-1 differential temperature auxiliary channel), two conductor branches (2 detection channels and 0-2 differential temperature auxiliary channels), or three conductor branches (3 detection channels and 2 differential temperature auxiliary channels).

Alternatively, the SAR sensor 130 is connected with 8 channels, and the SAR sensor 130 with 8 channels may be applied to three conductor branches (3 detection channels and 0-3 differential temperature auxiliary channels), four conductor branches (4 detection channels and 0-4 differential temperature auxiliary channels), five conductor branches (5 detection channels and 0-3 differential temperature auxiliary channels) and so on. When the sensing body 120 or the antenna radiator is connected with the SAR sensor 130, it is required that the wiring from the input pin of the SAR sensor 130 to an elastic sheet of the conductor branch shall be as short as possible. In order to minimize the influence of environmental capacitance, if the distance exceeds the set distance, for example, 10 mm, it is necessary to add the temperature compensation channel.

The first SAR antenna radiator 210 is used to operate at a frequency band for cellular communication, GPS L1, WIFI, and other communications, the second SAR antenna radiator 220 is a low-frequency antenna radiator, and the first antenna radiator 110 is a medium-high frequency antenna radiator. Therefore, the electronic device provided in the embodiments of the present disclosure can cover the whole frequency range through three antenna radiators, and can guide the power back-off (which reduces the transmit power of the antenna(s)) of the electronic device in the whole frequency range.

The embodiments of the present disclosure enables all frequency bands of the three antennas to be identified and covered through one SAR sensor 130 with at least 5 channels, which maximizes the utilization at a minimum sensor cost. For the conductor branch far away from the SAR sensor 130, a differential connection implemented through double channels is further used to introduce a temperature compensation mechanism, so as to improve the identification accuracy and anti-interference. Furthermore, two conductor branches are antenna radiators at the metal side frames, which minimizes the impact on the primary antenna while saving cost. In addition, the three conductor branches distributed in different positions of an electronic device cooperate with each other, which enables multiple scenes to be identified and thus ensures maximum communication performance in each scene. Compared with the related art, this scheme also ensures the communication performance of the electronic device, while ensuring that the SAR is in compliance with regulations.

In the case where the electronic device includes the first antenna radiator 110, when the capacitance signal that is sensed by the sensing body 120 and received by the controller 140 increases, the controller 140 controls the first antenna radiator 110 to reduce the transmit power.

When the capacitance signal sensed by the sensing body 120 increases continuously, it shows that the human body is approaching the first antenna radiator 120, and at this time, the controller controls the first antenna radiator 110 to reduce the transmit power. It is also possible that, when the capacitance signal sensed by the sensing body 120 increases continuously and it increases above a first preset capacitance value, the controller controls the first antenna radiator 110 to reduce the transmit power. When the capacitance signal sensed by the sensing body 120 decreases continuously, it shows that the human body is moving away from the first antenna radiator 110, and at this time, the first antenna radiator 110 may be controlled to operate at full power. In order to further ensure the SAR is in compliance with regulations, when the capacitance signal sensed by the sensing body 120 decreases continuously and it decreases below the preset capacitance value, the controller 140 may control the first antenna radiator 110 to operate at full power.

In the case where the electronic device includes the first antenna radiator 110 and the multiple SAR antenna radiators 200, when the capacitance signal that is sensed by the sensing body 120 and received by the controller 140 increases and the capacitance signals sensed by the multiple SAR antenna radiators 200 remains unchanged, the controller 140 controls the first antenna radiator 110 to reduce the transmit power and controls the SAR antenna radiators 2000 to operate at full power.

When the capacitance signal that is sensed by the sensing body 120 and received by the controller 140 increases, and the capacitance signal sensed by at least one of the multiple SAR antenna radiators 200 increases, the controller 140 controls the first antenna radiator 110 to reduce the transmit power, controls the SAR antenna radiator(s) whose sensed capacitance signal increases to reduce the transmit power, and controls the other SAR antenna radiators to operate at full power.

When the capacitance signal that is sensed by the sensing body 120 and received by the controller 140 remains unchanged, and the capacitance signal sensed by at least one of the multiple SAR antenna radiators 200 increases, the controller 140 controls the first antenna radiator 110 to operate at full power, controls the SAR antenna radiator(s) whose sensed capacitance signal increases to reduce the transmit power, and controls the other SAR antenna radiators operate at full power.

When the capacitance signal sensed by one SAR antenna radiator 200 increases continuously, it shows that the human body is constantly approaching the SAR antenna radiator 200, and the controller controls the SAR antenna radiator 200 to reduce the transmit power. The controller may also control the SAR antenna radiator 200 to reduce the transmit power, when the capacitance signal sensed by the SAR antenna radiator 200 increases continuously and it increases above the first preset capacitance value. When the capacitance signal sensed by the SAR antenna radiator 200 decreases continuously, it shows that the human body is moving away from the SAR antenna radiator 200, and at this time, the SAR antenna radiator 200 may be controlled to operate at full power. In order to further ensure the SAR is in compliance with regulations, when the capacitance signal sensed by the SAR antenna radiator 200 decreases continuously and it decreases below the preset capacitance value, the controller 140 may control the SAR antenna radiator 200 to operate at full power.

It is notable that, in the disclosed embodiments, the transmit power of each antenna radiator (the first antenna radiator and the SAR antenna radiators) is controlled by its corresponding sensed capacitance signal. That is, the power back-off (which reduces the transmit power of the antenna) in the embodiments of the present disclosure is at the antenna-level.

The electronic device provided in the embodiments of the present disclosure may be a mobile phone, a tablet computer, a desktop computer, a smart phone, an e-book reader, a multimedia player, a camera or a wearable device, etc., but is not limited thereto. The wearable device includes: accessories, such as a watch, a bracelet, glasses, a necklace, and a head-mounted electronic device; and clothing, such as smart electronic clothing, and implantable biological devices, which are not limited in the present disclosure embodiments.

Taking an electronic device being a smart phone as an example, other parts of the electronic device provided in the embodiments of the present disclosure are explained as follows.

Figure 7:
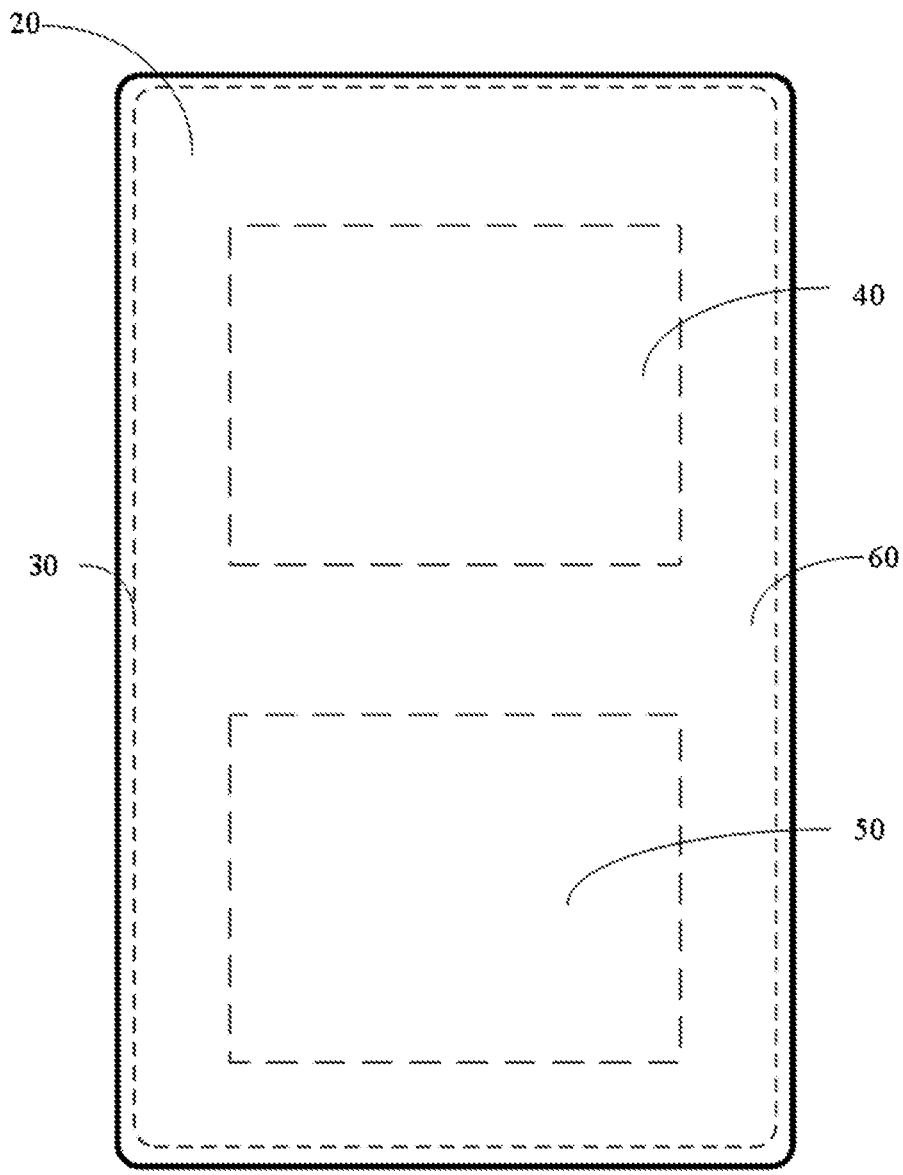
FIG. 7 is a schematic structural diagram of a fifth electronic device provided in exemplary embodiments of the present disclosure.

As illustrated in FIG. 7, the electronic device provided in the embodiments of the present disclosure may further include a display panel 20, a side frame 30, a mainboard 40, a battery 50, a back cover 60, and other devices. The display panel 20, the side frame 30 and the back cover 60 define an accommodation space for accommodating other electronic elements or functional modules of the electronic device. Further, the display panel 20 provides a display surface of the electronic device for displaying information such as images and texts. The display panel 20 may be for example a liquid crystal display (LCD) or an organic light-emitting diode (OLED) display.

The side frame 30 may be in a hollow frame structure. The material of the side frame 30 may include a conductor such as metal. The mainboard 40 is installed inside the accommodation space. For example, the mainboard 40 may be installed on the side frame 30 and accommodated in the accommodation space with the side frame 30. The mainboard 40 is provided with a ground point, for the grounding of the mainboard 40.

The side frame 30 is divided into multiple conductor branches, and the first SAR antenna radiator 210 is one of the multiple branches of the metal side frame. The first SAR antenna radiator 210 may be an antenna radiator in the upper left corner of the electronic device. The left side of the electronic device refers to a side of the electronic device located on the left when the display surface faces the user and the top of the electronic device faces upward. The first SAR antenna radiator 210 may realize cellular, GPS L1, and WIFI communications.

The first SAR antenna radiator 210 includes the first conductor part 211 and the second conductor part 212. The first conductor part 211 extends in the first direction. The second conductor part 212 is connected with the first conductor part 211. The second conductor part 212 extends in the second direction. The first direction and the second direction are perpendicular to each other. The second conductor part 212 is provided at the top of the side frame.

The first SAR antenna radiator 210 is connected with the first tuning circuit 213 and the first feeding circuit 214. The first feeding circuit 214 is configured to feed the first excitation signal, and the first excitation signal is configured to excite the first SAR antenna radiator 210 to receive and transmit the first radio frequency signal.

The second SAR antenna radiator 220 is connected with the SAR sensor 130, and the second SAR antenna radiator 220 is provided at the side frame of the electronic device. The second SAR antenna radiator 220 is one of the multiple branches of the metal side frame. The second SAR antenna radiator 220 may be the antenna radiator in the lower right corner of the electronic device. The right side of the electronic device refers to a side of the electronic device located on the right when the display surface faces the user and the top of the electronic device faces upward. The second SAR antenna radiator 220 is a low-frequency antenna.

The second SAR antenna radiator 220 includes the third conductor part 221 and the fourth conductor part 222. The third conductor part 221 is provided at the bottom of the side frame and located on the side of the first conductor part 211 away from the second conductor part 212, and the third conductor part 221 extends in the second direction. The fourth conductor part 222 is located on the side of the third conductor part 221 away from the first conductor part 211, and is connected with the third conductor part 221. The fourth conductor part 222 extends along the first direction.

The second SAR antenna radiator 220 is connected with the second tuning circuit 223 and the second feeding circuit 224. The second feeding circuit 224 is configured to feed the second excitation signal, and the second excitation signal is configured to excite the second SAR antenna radiator 220 to receive and transmit the second radio frequency signal. The second SAR antenna radiator 220 may be connected with the second tuning circuit through a second connection line, and the SAR sensor 130 may be connected with the second connection line.

The battery 50 is installed inside the accommodation space. For example, the battery 50 may be installed on the side frame 30 and accommodated in the accommodation space with the side frame 30. The battery 50 may be electrically connected with the mainboard 40 to supply power to the electronic device. The mainboard 40 may be provided with a power management circuit. The power management circuit is configured to distribute the voltage provided by the battery 50 to individual electronic elements in the electronic device.

The volume key, the power-off key, the card tray, etc. may be arranged in the side frame. The fingerprint module, the receiver, the speaker module, the camera module, the wireless charging module, the mainboard bracket, the subplate bracket, the NFC module and the camera decorative ring may be provided in the accommodation space. For example, the fingerprint module and the camera module may be provided at the back of the display panel. The receiver and the speaker module may be provided at the subplate. The wireless charging module may be provided at the mainboard.

The back cover 60 is configured to define the outer contour of the electronic device. The back cover 60 may be integrally formed. In a molding process of the back cover 60, structures, such as a hole for installation of a back camera and a hole for installation of a fingerprint identification module, may be provided in the back cover 60.

In the electronic device provided in the embodiments of the present disclosure, the sensing body 120 is provided within the preset distance threshold of the first antenna radiator 110 which cannot directly sense the SAR capacitance. The sensing body 120 senses the capacitance signal, and the SAR sensor 130 receives the capacitance signal and transmits it to the controller 140. The controller 140 controls, according to the capacitance signal, the transmit power of the first antenna radiator 110. In this way, the SAR signal of the grounded antenna radiator can be detected, and the transmit power of the grounded antenna radiator can be adjusted according to a fact whether the human body is close to or away from there. As such, the communication performance of the electronic device can be ensured, while ensuring that the SAR is in compliance with regulations.

Furthermore, through the first antenna radiator 110 and the multiple second antenna radiators 200, it can detect, at different positions of the electronic device, whether the part of the human body, such as the head or hand, is close to or away from there, so that the capacitance signals can be detected in different areas, which enables the fine control of the transmit power of antennas (the power of the antenna radiator where the human body is close to is reduced, and the antenna radiator where no human body is close to operates at full power). As such, the electronic device may balance the compliance of the SAR and the communication performance. Moreover, the first SAR antenna radiator 210 is used to operate at a frequency band for cellular communication, GPS L1, and WIFI, for example. The second SAR antenna radiator 220 is the low-frequency antenna radiator, and the first antenna radiator 110 is the medium-high frequency antenna radiator. Therefore, the electronic device provided in the embodiments of the present disclosure can cover the whole frequency range through three antenna radiators, and can guide the power back-off (which reduces the transmit power of the antenna(s)) of the electronic device in the whole frequency range.

Figure 8:
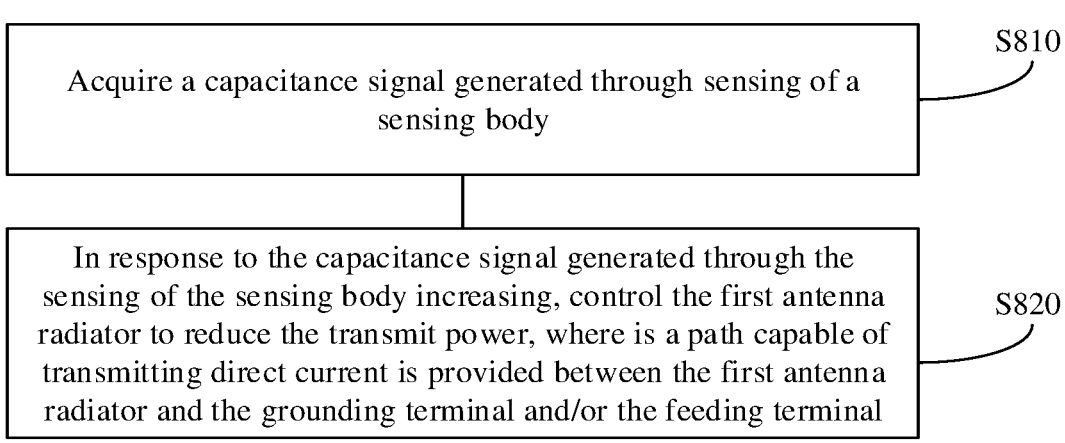
FIG. 8 is a schematic flowchart diagram of a control method for the first electronic device provided in exemplary embodiments of the present disclosure.

In the exemplary embodiments of the present disclosure, a control method for the electronic device is further provided. The control method for the electronic device may be used to control the electronic device described in the above embodiments. As illustrated in FIG. 8, the control method for the electronic device may include the following operations.

At block S810, a capacitance signal generated through sensing of the sensing body is acquired.

At block S820, in response to the capacitance signal generated through the sensing of the sensing body increasing, the first antenna radiator is controlled to reduce the transmit power, where a path capable of transporting a direct current is provided between the first antenna radiator and the at least one of the grounding terminal and the feeding terminal.

In the control method for the electronic device provided in the embodiments of the present disclosure, the sensing body 120 generates the capacitance signal by sensing the distance between the user and the sensing body 120. The SAR sensor 130 receives the capacitance signal generated through the sensing of the sensing body, and the controller 140 controls, according to the capacitance signal, the transmit power of the first antenna radiator. In this way, the electronic device can detect the SAR signal of the first antenna radiator 110 which has a direct current path to the at least one of the grounding terminal and the feeding terminal, and can further adjust the transmit power of the first antenna radiator 110 to ensure that the SAR is in compliance with regulations.

Figure 9:
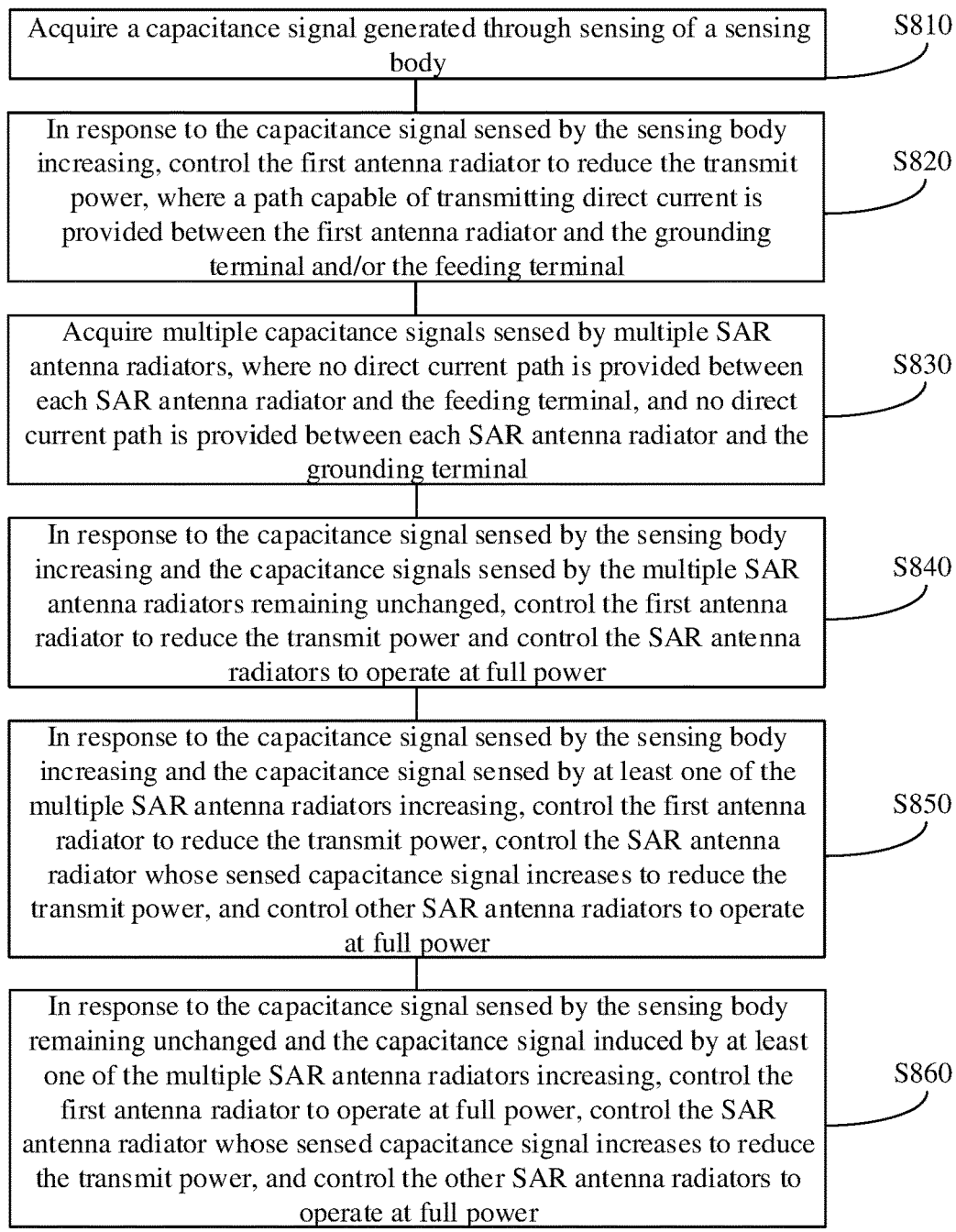
FIG. 9 is a schematic flowchart diagram of a control method for the second electronic device provided in exemplary embodiments of the present disclosure.

Further, as illustrated in FIG. 9, the control method for electronic device provided in the embodiments of the present disclosure may further include the following operations.

At block S830, multiple capacitance signals sensed by multiple SAR antenna radiators are acquired, where no direct current path is provided between each SAR antenna radiator and the feeding terminal, and no direct current path is provided between each SAR antenna radiator and the grounding terminal.

At block S840, in response to the capacitance signal sensed by the sensing body increasing and the capacitance signals sensed by the multiple SAR antenna radiators remaining unchanged, the first antenna radiator is controlled to reduce the transmit power and the SAR antenna radiators are controlled to operate at full power.

At block S850, in response to the capacitance signal sensed by the sensing body increasing and the capacitance signal sensed by at least one of the multiple SAR antenna radiators increasing, the first antenna radiator is controlled to reduce the transmit power, the SAR antenna radiator whose sensed capacitance signal increases is controlled to reduce the transmit power, and other SAR antenna radiators are controlled to operate at full power.

At block S860, in response to the capacitance signal sensed by the sensing body remaining unchanged and the capacitance signal sensed by at least one of the multiple SAR antenna radiators increasing, the first antenna radiator is controlled to operate at full power, the SAR antenna radiator whose sensed capacitance signal increases is controlled to reduce the transmit power, and the other SAR antenna radiators are controlled to operate at full power.

It is notable that the details of each block of the control method for the electronic device in the embodiments of the present disclosure have been recorded in the embodiments of the electronic device, which are not repeated here.

In the exemplary embodiments of that present disclosure, a non-transitory computer-readable storage medium is further provided, on which a program product capable of implementing the method mentioned above in the specification is stored. In some possible embodiments, various aspects of the present disclosure may further be implemented in the form of a program product including program codes. When the program product is run on a terminal device, the program codes are configured to cause the terminal device to implement the operations according to various exemplary embodiments of the disclosure described in the above section "exemplary method" of the specification.

Figure 10:
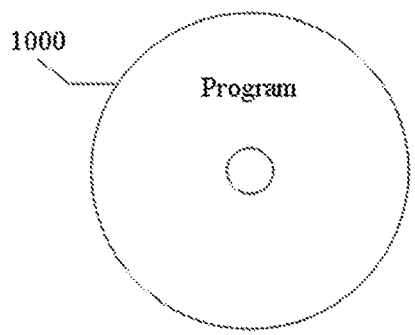
FIG. 10 is a schematic diagram of a computer-readable storage medium provided in exemplary embodiments of the present disclosure.

Referring to FIG. 10, a program product 1000 for implementing the method above according to the embodiments of the present disclosure is described. The program product 1000 may be a portable compact disc read-only memory (CD-ROM) and include program codes. The program product 1000 may run on a terminal device, such as a personal computer. However, the program product of the present disclosure is not limited thereto. In this disclosure, the readable storage medium may be any tangible medium containing or storing a program, and the program may be used by or in combination with an instruction execution system, apparatus or device.

The program product may be in the form of any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (a non-exhaustive list) of the readable storage media include: an electrical connection with one or more wires, a portable disk, a hard disk, a random access memory (RAM), a read-only memory (ROM), an erasable programmable read-only memory (EPROM or flash memory), an optical fiber, the portable compact disk read-only memory (CD-ROM), an optical storage device, a magnetic storage device, or any suitable combination of the above.

A computer-readable signal medium may include a data signal propagated in a baseband or as part of a carrier wave, and readable program codes are carried in the computer-readable signal medium. Such propagated data signal may be in many forms, including but not limited to electromagnetic signal, optical signal, or any suitable combination of the above. The readable signal medium may further be any readable medium other than the readable storage medium, and the readable storage medium may send, propagate, or transmit a program for use by or in combination with the instruction execution system, apparatus, or device.

The program codes contained in the readable medium may be transmitted by any suitable medium, including but not limited to wireless, wired, optical cable, RF, etc., or any suitable combination of the above.

The program codes for implementing the operations of the disclosure may be written in any combination of one or more programming languages, including object-oriented programming languages such as Java, C++, etc., as well as conventional procedural programming languages such as "C" or similar programming languages. The program codes may be entirely executed on a user computing device, partially executed on a user equipment, executed as an independent software package, partially executed on the user computing device and partially executed on a remote computing device, or entirely executed on the remote computing device or a server. In the case involving the remote computing device, the remote computing device may be connected with the user computing device through any kind of network, including a local area network (LAN) or a wide area network (WAN), or the remote computing device may be connected with an external computing device (for example, connected over Internet by using an Internet service provider).

In addition, the drawings above are only schematic illustrations of the processes included in the method according to the exemplary embodiments of the present disclosure, and are not limiting the purposes. It is easy to understand that the processes illustrated in the above figures do not indicate or limit the time sequence of these processes. In addition, it is also easy to understand that these processes may be for example implemented synchronously or asynchronously in multiple modules.

Other embodiments of the present disclosure are readily apparent to those skilled in the art after considering the specification and practicing the disclosure disclosed herein. The present disclosure is intended to cover any variations, uses or adaptations of the present disclosure, where these variations, uses or adaptations of the present disclosure follow the general principles of the present disclosure and include common sense or common technical means in the technical art that are not disclosed in the present disclosure. The specification and embodiments are construed as being exemplary only, with a true scope and spirit of the present disclosure being defined by the appended claims.

What is claimed is:

1. An electronic device, comprising:
a first antenna radiator, wherein a path capable of transporting a direct current is provided between the first antenna radiator and at least one of a grounding terminal and a feeding terminal;
a sensing body, wherein the sensing body is configured to generate a first capacitance signal by sensing a distance between a user and the sensing body, and a distance between the first antenna radiator and the sensing body is less than a first preset distance threshold;
a SAR antenna radiator, wherein there is no direct current path between the SAR antenna radiator and the feeding terminal, and there is no direct current path between the SAR antenna radiator and the grounding terminal;
a SAR sensor, wherein the SAR sensor is connected with the sensing body and the SAR antenna radiator, and the SAR sensor is configured to receive the first capacitance signal generated through the sensing of the sensing body and a second capacitance signal sensed by the SAR antenna radiator; and
a controller, wherein the controller is connected with the SAR sensor, and the controller is at least configured to control, according to the first capacitance signal, a transmit power of the first antenna radiator;
when a distance between one of the SAR antenna radiator and the SAR sensor is less than or equal to a second preset distance threshold, the SAR antenna radiator is connected with the SAR sensor through a detection channel; and when the distance between the SAR antenna radiator and the SAR sensor is greater than the second preset distance threshold, the SAR antenna radiator is in differential connection with the SAR sensor through the detection channel and an auxiliary channel.

2. The electronic device of claim 1, wherein the sensing body is a parasitic branch, the parasitic branch is coupled with the first antenna radiator, and the parasitic branch is configured to detect the first capacitance signal.

3. The electronic device of claim 2, wherein the parasitic branch is a flexible circuit board, and the flexible circuit board is coupled with the first antenna radiator.

4. The electronic device of claim 1, wherein the sensing body is not coupled with the first antenna radiator, and the sensing body is one or more of a volume key, a power-on key, a fingerprint module, a receiver, a speaker module, a camera module, a wireless charging module, a mainboard bracket, a subplate bracket, an NFC module, a camera decorative ring, an electroacoustic module, and a conductor card tray.

5. The electronic device of claim 1, wherein the first antenna radiator is provided in a first area of a side frame of the electronic device, the SAR antenna radiator is provided in a second area of the side frame of the electronic device, and the first area of the side frame and the second area of the side frame do not overlap.

6. The electronic device of claim 5, wherein the SAR antenna radiator comprises a plurality of SAR antenna radiators comprising:
a first SAR antenna radiator; and
a second SAR antenna radiator, wherein the first SAR antenna radiator and the second SAR antenna radiator are provided at different positions in the second area of the side frame;
wherein there is a gap between the first antenna radiator and the first SAR antenna radiator, and the gap is filled with an insulating material; and the controller is further configured to control, according to each of the second capacitance signals sensed by the plurality of SAR antenna radiators, a transmit power of a respective SAR antenna radiator.

7. The electronic device of claim 6, wherein the first SAR antenna radiator comprises:
a first conductor part, wherein the first conductor extends along a first direction; and
a second conductor part, wherein the second conductor part is connected with the first conductor part, the second conductor part extends along a second direction, the first direction is perpendicular to the second direction, and the second conductor part is provided at a top of the side frame; and
wherein the second SAR antenna radiator comprises:
a third conductor part, wherein the third conductor part is provided at a bottom of the side frame, and is located on a side of the first conductor part away from the second conductor part, and the third conductor part extends along the second direction; and
a fourth conductor part, wherein the fourth conductor part is located on a side of the third conductor part away from the first conductor part, and is connected with the third conductor part; the fourth conductor part extends along the first direction; the first antenna radiator is provided at the top of the side frame, and the first antenna radiator is located on a side of the second conductor part away from the first conductor part.

8. The electronic device of claim 6, wherein when the first capacitance signal that is sensed by the sensing body and received by the controller increases, and the second capacitance signals sensed by the plurality of the SAR antenna radiators remain unchanged, the controller is configured to control the first antenna radiator to reduce the transmit power, and control the SAR antenna radiators to operate at full power;

when the first capacitance signal that is sensed by the sensing body and received by the controller increases, and the second capacitance signal sensed by at least one of the plurality of SAR antenna radiators increases, the controller is configured to control the first antenna radiator to reduce the transmit power, control the at least one of the SAR antenna radiators whose sensed second capacitance signal increases to reduce the transmit power, and control other SAR antenna radiators to operate at full power; and when the first capacitance signal that is sensed by the sensing body and received by the controller remains unchanged, and the second capacitance signal sensed by at least one of the plurality of SAR antenna radiators increases, the controller is configured to control the first antenna radiator to operate at full power, control the at least one of the SAR antenna radiators whose sensed second capacitance signal increases to reduce the transmit power, and control other SAR antenna radiators to operate at full power.

9. The electronic device of claim 6, wherein the first antenna radiator is a mid-high frequency antenna radiator, the first SAR antenna radiator is configured to operate at a frequency band for cellular communication, GPS L1 and WIFI, and the second SAR antenna radiator is a low-frequency antenna radiator.

10. The electronic device of claim 6, wherein the first SAR antenna radiator is connected with a first tuning circuit and a first feeding circuit, the first feeding circuit is configured to feed a first excitation signal, the first excitation signal is configured to excite the first SAR antenna radiator to receive and transmit a first radio frequency signal, and the first tuning circuit is configured to tune a frequency of the first radio frequency signal;
the second SAR antenna radiator is connected with a second tuning circuit and a second feeding circuit, the second feeding circuit is configured to feed a second excitation signal, the second excitation signal is configured to excite the second SAR antenna radiator to receive and transmit a second radio frequency signal, the second tuning circuit is configured to tune a frequency of the second radio frequency signal, and the first radio frequency signal is at a frequency band different from the second radio frequency signal.

11. The electronic device of claim 1, wherein when the distance between the SAR antenna radiator and the SAR sensor is greater than the second preset distance threshold, the detection channel is configured to generate a first noise signal by sensing an environmental noise, and the auxiliary channel is configured to generate a second noise signal by sensing the environmental noise; the second noise signal is configured to simulate the first noise signal, so that a signal transmitted to the SAR sensor through the detection channel is capable of being compensated based on the second noise signal.

12. The electronic device of claim 11, wherein the auxiliary channel is configured to make the second noise signal be consistent with the first noise signal.

13. The electronic device of claim 12, wherein a capacitance-temperature curve of the auxiliary channel is consistent with a capacitance-temperature curve of the detection channel;
or
wherein a wiring path of the auxiliary channel is consistent with a wiring path of the detection channel.

14. The electronic device of claim 1, wherein when the first capacitance signal received by the controller increases, the controller is configured to control the first antenna radiator to reduce the transmit power.

15. A control method for an electronic device, comprising:
acquiring a first capacitance signal generated through sensing of a sensing body of the electronic device; and
in response to the first capacitance signal generated through the sensing of the sensing body increasing, controlling a first antenna radiator of the electronic device to reduce a transmit power, wherein a path capable of transporting a direct current is provided between the first antenna radiator and at least one of a grounding terminal and a feeding terminal, and a distance between the sensing body and the first antenna radiator is less than a first preset distance threshold;
wherein the electronic device further comprises a SAR sensor and a SAR antenna radiator, the SAR sensor is connected with the sensing body and the SAR antenna radiator, there is no direct current path between the SAR antenna radiator and the feeding terminal, and there is no direct current path between the SAR antenna radiator and the grounding terminal;
wherein when a distance between the SAR antenna radiator and the SAR sensor is less than or equal to a second preset distance threshold, the SAR antenna radiator is connected with the SAR sensor through a detection channel; and when the distance between the SAR antenna radiator and the SAR sensor is greater than the second preset distance threshold, the SAR antenna radiator is in differential connection with the SAR sensor through the detection channel and an auxiliary channel; and
the method further comprises:
controlling, according to a second capacitance signal sensed by the SAR antenna radiator, a transmit power of the SAR antenna radiator.

16. The method of claim 15, wherein the SAR antenna radiator comprises a plurality of SAR antenna radiators, and the method further comprises:
acquiring the second capacitance signals sensed by the plurality of SAR antenna radiators;
in response to the first capacitance signal sensed by the sensing body increasing and the second capacitance signals sensed by the plurality of SAR antenna radiators remaining unchanged, controlling the first antenna radiator to reduce the transmit power, and controlling the SAR antenna radiators to operate at full power; and
in response to the first capacitance signal sensed by the sensing body increasing and the second capacitance signal sensed by at least one of the plurality of SAR antenna radiators increasing, controlling the first antenna radiator to reduce the transmit power, controlling the at least one of the SAR antenna radiators whose sensed second capacitance signal increases to reduce the transmit power, and controlling other SAR antenna radiators to operate at full power.

17. The method of claim 16, further comprising:
in response to the first capacitance signal sensed by the sensing body remaining unchanged and the second capacitance signal sensed by at least one of the plurality of SAR antenna radiators increasing, controlling the first antenna radiator to operate at full power, controlling the at least one of the SAR antenna radiators whose sensed second capacitance signal increases to reduce the transmit power, and controlling other SAR antenna radiators to operate at full power.

18. An electronic device, comprising:
a first antenna radiator, wherein a path capable of transporting a direct current is provided between the first antenna radiator and at least one of a grounding terminal and a feeding terminal;
a sensing body, wherein the sensing body is configured to generate a first capacitance signal by sensing a distance between a user and the sensing body, and a distance between the first antenna radiator and the sensing body is less than a first preset distance threshold;
a SAR antenna radiator, wherein there is no direct current path between the SAR antenna radiator and at least one of the feeding terminal and the grounding terminal, and the SAR antenna radiator is spaced apart from the first antenna radiator;
a SAR sensor, wherein the SAR sensor is connected with the sensing body and the SAR antenna radiator, and the SAR sensor is configured to receive the first capacitance signal generated through the sensing of the sensing body and a second capacitance signal sensed by the SAR antenna radiator; and
a controller, wherein the controller is connected with the SAR sensor, and the controller is configured to control, according to the first capacitance signal, a transmit power of the first antenna radiator, and control, according to the second capacitance signal, a transmit power of the SAR antenna radiator;
wherein when a distance between the SAR antenna radiator and the SAR sensor is less than or equal to a second preset distance threshold, the SAR antenna radiator is connected with the SAR sensor through a detection channel; and when the distance between the SAR antenna radiator and the SAR sensor is greater than the second preset distance threshold, the SAR antenna radiator is in differential connection with the SAR sensor through the detection channel and an auxiliary channel.

19. The electronic device of claim 18, wherein when the distance between the SAR antenna radiator and the SAR sensor is greater than the second preset distance threshold, the detection channel is configured to generate a first noise signal by sensing an environmental noise, and the auxiliary channel is configured to generate a second noise signal by sensing the environmental noise; the second noise signal is configured to simulate the first noise signal, so that a signal transmitted to the SAR sensor through the detection channel is capable of being compensated based on the second noise signal.

20. The electronic device of claim 19, wherein a capacitance-temperature curve of the auxiliary channel is consistent with a capacitance-temperature curve of the detection channel;
or
wherein a wiring path of the auxiliary channel is consistent with a wiring path of the detection channel.

* * * * *